(12) United States Patent
Clarke et al.

(10) Patent No.: US 12,495,964 B2
(45) Date of Patent: Dec. 16, 2025

(54) ALIGNMENT SYSTEM FOR OPHTHALMIC INSTRUMENT

(71) Applicant: CooperVision International Limited, Fareham (GB)

(72) Inventors: Roger Brian Minchin Clarke, Cambridge (GB); Will Hamlyn, Cambridge (GB); Richard Lintern, Cambridge (GB); James Richardson, Cambridge (GB); Karl Jessel, Cambridge (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 498 days.

(21) Appl. No.: 17/971,656

(22) Filed: Oct. 24, 2022

(65) Prior Publication Data

US 2023/0139610 A1    May 4, 2023

Related U.S. Application Data

(60) Provisional application No. 63/272,827, filed on Oct. 28, 2021.

(51) Int. Cl.
*A61B 3/15*    (2006.01)
*A61B 3/00*    (2006.01)

(52) U.S. Cl.
CPC ............ *A61B 3/152* (2013.01); *A61B 3/0008* (2013.01)

(58) Field of Classification Search
CPC .............................. A61B 3/152; A61B 3/0008
(Continued)

(56) References Cited

U.S. PATENT DOCUMENTS

2004/0143246 A1* 7/2004 Maeda ..................... A61F 9/008
606/5
2015/0150448 A1* 6/2015 Takii ...................... A61B 3/152
351/208
(Continued)

FOREIGN PATENT DOCUMENTS

CN        105929963 A    9/2016
EP         1308125 A2    5/2003
JP      2000051151 A  *  2/2000

OTHER PUBLICATIONS

JP 2000051151—Feb. 2000—Kataoka—English translation.*
(Continued)

*Primary Examiner* — Sharrief I Broome
(74) *Attorney, Agent, or Firm* — Kilyk & Bowersox, P.L.L.C.

(57) ABSTRACT

A method of, and apparatus for, aligning an ophthalmic instrument relative to an eye is disclosed, and can include aligning an esthesiometer with a patient's eye. The method can include steps of: directing a beam of light from an ophthalmic instrument to an eye; taking, at a plurality of locations around the beam, measurements of reflections of the light from the eye; determining the position of the ophthalmic instrument relative to the eye from the measurements; and moving the ophthalmic instrument relative to the eye from the determined position to a desired position. The apparatus can include an aperture, a source of collimated light, a plurality of detectors, and a control unit. The control unit determines a position of the ophthalmic instrument relative to the eye and can move relative positions of the ophthalmic instrument and the eye from a determined position to a desired position.

14 Claims, 7 Drawing Sheets

(58) Field of Classification Search
USPC .......................................................... 351/205
See application file for complete search history.

(56) References Cited

U.S. PATENT DOCUMENTS

| | | | |
|---|---|---|---|
| 2018/0055358 A1* | 3/2018 | Nakajima | A61B 3/15 |
| 2018/0132715 A1* | 5/2018 | Kislinger | A61B 3/14 |
| 2021/0007601 A1* | 1/2021 | Schmoll | G01B 9/02032 |

OTHER PUBLICATIONS

International Search Report and Written Opinion issued in corresponding International Patent Application No. PCT/GB2022/052710 mailed Jan. 2, 2023 (11 pages).
International Preliminary Report on Patentability issued in corresponding International Patent Application No. PCT/GB2022/052710 dated Mar. 6, 2024 (36 pages).
Response to Second Written Opinion filed Dec. 5, 2023 in corresponding International Patent Application No. PCT/GB2022/052710 (26 pages).
Third Written Opinion issued in corresponding International Patent Application No. PCT/GB2022/052710 mailed Feb. 5, 2024 (7 pages).
Response to Third Written Opinion filed Feb. 19, 2024 in corresponding International Patent Application No. PCT/GB2022/052710 (15 pages).
Office Action issued in corresponding Taiwan Patent Application No. 111140569 mailed Aug. 16, 2023 (with English translation)(17 pages).
PCT Demand filed Aug. 23, 2023 in corresponding International Patent Application No. PCT/GB2022/052710 (26 pages).
Second Written Opinion issued in corresponding International Patent Application No. PCT/GB2022/052710 dated Oct. 5, 2023 (5 pages).

* cited by examiner

ALIGNMENT SYSTEM FOR OPHTHALMIC INSTRUMENT

This application claims the benefit under 35 U. S.C. § 119(e) of prior U.S. Provisional Patent Application No. 63/272,827, filed Oct. 28, 2021, which is incorporated in its entirety by reference herein.

FIELD

The disclosure concerns a method of, and apparatus for, aligning an ophthalmic instrument relative to an eye. More particularly, but not exclusively, this disclosure concerns aligning an esthesiometer with a patient's eye.

BACKGROUND

Many ophthalmic instruments must be accurately aligned with the eye. For example, ophthalmic instruments such as esthesiometers (aesthesiometers) are used to measure corneal sensitivity at the surface of an eye. Traditionally, corneal sensitivity has been measured using a contact method, but this method may provide inaccurate measurements. One example of such an instrument uses a single nylon thread to produce various forces on the cornea. Another example of a less invasive method of measuring corneal sensitivity is a non-contact air-puff technique (pneumatic esthesiometer), wherein the pressure or flow rate of the air-puff presented to the cornea can be changed until the patient detects the sensation.

The cornea protrudes outwards from the eye and has a radius of curvature that is largely independent of the curvature of the sclera. The shape of the cornea, and its position with respect to the eye socket, can vary from patient to patient which can make alignment of the instrument with the cornea difficult. Movements of the eye during the alignment process can result in misalignment of the ophthalmic instrument relative to the eye.

In prior-art pneumatic esthesiometers, the position of the nozzle is adjusted by the investigator using a two-camera system; one to view the distance from the cornea to the nozzle (z direction) and the other to position the nozzle in the centre of the cornea (x, y direction). Positioning the cameras can be time consuming, particularly when having to set up multiple instruments. The patient is required to remain still and with at least one eye open, which can be discomforting for the patient. It is also a potential source of variability if the positioning is not the same from one visit to the next. The integration of a two-camera system to detect the position of the eye may be spatially and computationally demanding, which may add to the complexity of the detection system and limit the minimum size of the system.

The present disclosure seeks to provide an improved method of, and apparatus for, aligning an ophthalmic instrument relative to an eye.

SUMMARY

According to a first aspect of the present disclosure there is provided a method having the features set out as described herein.

According to a second aspect of the present disclosure, there is provided an apparatus having the features as described herein.

According to a third aspect of the present disclosure, there is provided an ophthalmic instrument having as described herein.

Preferred, but optional, features of the present disclosure are set out below.

It will of course be appreciated that features described in relation to one aspect of the present disclosure may be incorporated into other aspects. For example, the method of the disclosure may incorporate any of the features described with reference to the apparatus of the disclosure and vice versa.

BRIEF DESCRIPTION OF DRAWINGS

Embodiments of the present disclosure will now be described by way of example only with reference to the accompanying schematic drawings of which.

DETAILED DESCRIPTION

In a first aspect, this disclosure provides a method of aligning an ophthalmic instrument with respect to an eye, comprising the steps of: directing a beam of light from the ophthalmic instrument to the eye; taking, at a plurality of locations around the beam, measurement of reflections of the light reflected from the eye; determining the position of the ophthalmic instrument relative to the eye from the measurements; and moving the ophthalmic instrument relative to the eye from the determined position to a desired position.

The method provides an improved and simpler method of aligning an ophthalmic instrument with a patient's eye compared with prior-art instruments. The present method removes the need for multiple and separate systems, such as cameras and light sources, and allows an investigator to align the ophthalmic instrument with a patient's eye efficiently.

The ophthalmic instrument may be an esthesiometer (aesthesiometer). The ophthalmic instrument may be positioned in front of the eye along the direction of the optical axis of the eye. Eye tests, and particularly tests which involve corneal sensitivity, require a high level of precision. The present method may reduce the time spent aligning the instrument with the eye, provide continuous monitoring of eye position, and increase the accuracy of the alignment. By reducing the time taken to align the ophthalmic instrument with the eye, the investigator (e.g., an optometrist or eye doctor) has more time to assess the patient.

The method may include the step of aligning the ophthalmic instrument with the centre of the cornea of the eye. The dimensions and structure of the cornea of the eye can vary from patient to patient. The present method provides an improved method of aligning an ophthalmic instrument with the centre of the cornea and at a predetermined distance from the cornea.

The investigator may manually align the ophthalmic instrument with the centre of the cornea of the eye before measurements are taken. The cornea is visible to the investigator and can serve as a reference point to initially align the ophthalmic instrument with the patient's eye.

The beam of light may be a beam of collimated light. The diameter of the beam of light will depend on the collimator. The beam may have a diameter of 1 mm. The beam diameter may be between 0.1 and 10 mm. The beam diameter may be smaller than the diameter of collimator.

The method may comprise the step of, at the plurality of locations around the beam, measuring the intensity of light reflected from the eye. The intensity of light that is reflected from the eye is then used to determine the position of the ophthalmic instrument with respect to the eye. The reflected light may be reflected from the cornea of the eye. As previously mentioned, if the area of interest is the cornea of the eye, the beam of light may be sized to be limited to the area of the cornea, so that the light is reflected from the cornea only.

The measurement of the reflected light may determine the position of the ophthalmic instrument in three dimensions i.e., in the z-axis, defined as the direction of the optical axis of the eye, and in the x- and y-axes, which define the plane transverse to the optical axis of the eye. The position of the ophthalmic instrument relative to the eye in the x- and y-axes may be determined independently to the position of the ophthalmic instrument relative to the eye in the z-axis.

The light may be reflected directly from the eye. The light incident on the surface of the eye may reflect back along the direction of the incident light beam. In a perfect arrangement where the cornea of the eye is perfectly convex and the instrument is directly aligned at the centre of the cornea, if the beam of light were infinitesimally narrow and thus incident on an infinitesimal point on the cornea, then the light would reflect directly back along the direction of the beam. In practice, even when perfectly aligned, the light reflects from the convex surface at a range of angles with respect to the axis of the incident light beam since the incident light beam has a finite diameter and hence a range of angles of incidence on the cornea.

The reflected light may be measured at for example 3, 4, 5, 6, 7, 8 or more than 8 positions located around the beam of light. The positions may be circumferentially distributed around the beam of light. For example, if there are four positions for measuring the light located around the beam of light, they may be located above, below, left, and right of the beam of light.

The reflected light may be measured at locations that are arranged symmetrically around the beam of light. For example, the reflected light may be measured at a location above and below the beam of light, and/or to the right and left of the beam of light, such that each location is arranged at a 90° angle to one another. Preferably, when the instrument is accurately aligned with the eye, the measurement of the reflected light is symmetrically distributed across the positions. This is advantageous as any imbalances of light distributed at the symmetrical locations around the beam of light may provide a guide to aligning the instrument relative to the eye.

The step of determining the position of the ophthalmic instrument relative to the eye may be done by calculating the difference in the measured light received at each position. The position of the ophthalmic instrument relative to the eye in the x- and y-axes may be determined by comparing the intensity of light at two diametrically opposing positions. For example, the position of the ophthalmic instrument relative to the eye along the x-axis may be determined by calculating the difference in the intensity of light measured at either side of the beam of light e.g., to the left and to the right of the beam, at positions that are 180° to each other. The position of the ophthalmic instrument relative to the eye along the y-axis may be determined by calculating the difference in the intensity of light measured above and below the beam of light.

The step of determining the position of the ophthalmic instrument relative to the eye may include calculating the total amount of incident light received at the plurality of locations. The total amount of light incident on the plurality of locations may provide positional information of the ophthalmic instrument relative to the eye along the z-axis.

The ophthalmic instrument may be moved in a direction that equalizes, or tends to equalise, the measurements received around the beam. For example, if the measurement of the reflected light, for example detected by a detector, is greater (e.g., a higher intensity) at a position above the light beam than the measurement of the reflected light below the light beam, the ophthalmic instrument may be adjusted with respect to the eye to make the measurement of reflected light at those opposite positions proximately equal (e.g., within 10%, within 5%, within 1%, for instance).

The method may comprise a step of providing instructions for moving the ophthalmic instrument relative to the eye. There may be a controlled actuator configured to receive instructions and move the instrument relative to the eye. The method may comprise a step of instructing the patient to move their head/eye relative to the ophthalmic instrument. There may be a display or other visible light sources which may provide instructions in the form of a signal for the patient. The method may comprise a step of instructing the investigator. There may be a user interface configured to receive instructions and display the instructions to the investigator, for example via a software display. The investigator may manually move the position of the ophthalmic instrument relative to the eye. The investigator may direct the patient to move their head/eye relative to the ophthalmic instrument, for example they may explain the instructions verbally.

The method may comprise a step of confirming the longitudinal alignment of the ophthalmic instrument relative to the eye by using a camera. The camera may be positioned at a 90° angle to the direction of the light beam, and to the side of the patient's eye. The method may comprise taking an image of the eye. The image may be used to assist the process of determining the position of the eye and aligning the ophthalmic instrument relative to the eye.

In a second aspect, this disclosure provides an apparatus for aligning an ophthalmic instrument relative to an eye. The apparatus comprises a source of collimated light configured to be directed through an aperture to an eye; a plurality of detectors arranged around the aperture to measure light reflected from the eye; and a control unit configured to determine the position of the ophthalmic instrument relative to the eye and to move the relative positions of the ophthalmic instrument and the eye from the determined position to a desired position.

The light may be infra-red light. The source may be an infrared light emitting diode (LED). In some examples, the light source may be visible light. However, to get a measurement of the cornea of the eye using visible light, it may in some circumstances be necessary to have high intensity visible light in order for the light to reflect from the cornea, which could be hazardous to other parts of the eye. The use of infrared light provides a safer alternative to using high intensity visible light which may improve the amount of light reflected from the eye and provide quicker measurement of the position of the ophthalmic instrument relative to the eye.

The light source may be a low intensity infrared light source. Low intensity infrared light may reduce the risk of heating the corneal surface and/or other parts of the eye.

The apparatus may comprise a plurality of light sources. Each light source may emit light of different frequencies, for example there may be an infrared LED and a visible LED. Other light sources known to the skilled person may be used. A visible light source may be combined with an infrared light source to improve the alignment of the ophthalmic instrument with the eye. In healthy eyes, the cornea is transparent to visible light. A low intensity visible light source may provide a signal to the patient to centre their eye with the ophthalmic instrument. The visible light may comprise different colours that provide the patient with a guide for positioning their eye. For example, there may be red, amber and green light to signify if the eye is too close, far or at the correct position relative to the ophthalmic instrument. The light may provide special information by changing colour, or by changing the amplitude of the light or special patterns (for example flashing lights). The light may be a simple spot as seen by the user which may be used as a fixation target. This may be an LED source where the light is incident on the retina via a lens or series of lenses (a simple LED without a lens/lenses may be viewed as an unfocussed spot on the retina). In other examples a mask may be imaged onto the retina via a lens or series of lenses, which may be illuminated by one or more LEDs of one or more different colours. In other examples, an LCD, OLED or other self-emissive display may be used with a lens or series of lenses to focus the display on the retina. Alternatively, there may be other signalling sources that assist the patient in aligning their eye with the ophthalmic instrument, such as an audible sound.

The aperture through which the light is directed may be an elongated tube. The aperture may be connected or fixed to the light source. The aperture may comprise an entrance portion wherein the light enters, and an exit portion where the light exits. The aperture is positioned such that the exit portion is near the surface of the eye. The exit portion of the aperture may for example be positioned a distance between 0.5 mm and 50.0 mm from the surface of the eye. The aperture may be connected to the ophthalmic instrument. The aperture may be part of the ophthalmic instrument, for example the aperture may be the nozzle of a pneumatic esthesiometer where air is directed towards the eye.

The light may be collimated at the source. There may be optical components that collimate the light. The nozzle of a pneumatic esthesiometer may be configured to direct and collimate the light.

The diameter of the aperture may for example be between 0.1 and 6.0 mm.

The aperture may be aligned with the cornea of the eye. The aperture may be positioned along the optical axis of the eye.

The apparatus may comprise at least three detectors, for example the detectors may be arranged at 120° angle from one another around the aperture. The apparatus may comprise more than three detectors. The apparatus may comprise between three and ten detectors positioned around the aperture.

The detectors may be arranged symmetrically around the aperture. Having symmetrically positioned detectors provides a better measurement of the distribution of light that is reflected from the eye. The measurement of the reflected light may be used to determine the position of the ophthalmic instrument with respect to the eye in three-dimensions i.e., in the z-axis, and/or the x- and y-axes. The position of the ophthalmic instrument relative to the eye along the x- and y-axes may be calculated by the imbalance of the intensity of light incident on diametrically opposed detectors. For example, measurements at detectors positioned above and below the aperture may provide the position the ophthalmic instrument relative to the eye in y-axis. The position of the ophthalmic instrument relative to the eye along the z-axis may be determined by measuring the changes in the radial distribution of the reflected light at the detectors. In some examples, a greater number of detectors circumferentially and radially distributed around the aperture may provide more accurate measurements of the position of the ophthalmic instrument in the x, y and z axes.

The detectors may be photodiodes. The detectors may be infrared detectors. It will be appreciated that other detectors known to the skilled person may be used. There may be different detectors for detecting different frequencies of light, for example, there may be a first set of detectors for detecting infrared light arranged circumferentially around the aperture and a second set of detectors for detecting visible light arranged circumferentially around the first set of detectors.

The detectors may be disposed away from the exit portion of the aperture along the direction of the optical axis. The detectors may be positioned a distance away from the eye for optimal detection and distribution of the light. The detectors may be mounted on a plate. The plate may be circular with a central hole for the incident light to be directed from the source to the eye. The central hole of the plate may be configured to fit around the nozzle of an ophthalmic instrument. The plate may be a sensor printed circuit board (PCB). The detectors may be affixed to the PCB.

The control unit may comprise a main controller board. The control unit may be connected to the detectors in order to receive the detected signal. The control unit may determine the position of the ophthalmic instrument with respect to the eye.

The apparatus as described herein can include a computing system that is part of the control unit 50 (for instance) for controlling the detectors and other functions as described herein. The computing system can include, for example, a general processor, a digital signal processor (DSP) for continuously processing digital signals, a microprocessor, an application-specific integrated circuit (ASIC), an integrated circuit consisting of logic elements, a field programmable logic array (FPGA), or other integrated circuits (IC) or hardware components for carrying out one or more of the individual method steps and apparatus functions described herein. Computing system further includes a memory that stores a data-processing program (software) that can run on the hardware components in order to carry out the method steps. Computing system further includes a user interface as described herein. User interface can include hardware, software, firmware, or a combination thereof to enable a user to communicate and send commands to computing system. For example, user interface can include, but is not limited to, a display, a touch-screen display, a keyboard, a keypad, a mouse, a virtual reality interface, an augmented reality interface, a voice command interface, one or more speakers, one or more microphones, combinations thereof, and the like.

The control unit (e.g., 50) can comprise a processor, microprocessor, central processing unit (CPU), computer, or other processing device. The control unit can comprise multiple processors, a comparator, a regulator, logic circuitry, and the like components as would be recognized by those of skill in the art. The control unit can be a component of a central control unit. The central control unit can have a data processing unit, for example, a microprocessor, on which a data processing program, for example, software, can run. The control unit can be operated by a remote device. The remote device can comprise a mobile communications device, a cellphone, a smartphone, a tablet, a smartwatch, a physician network computer, a laptop computer, a desktop computer, a remote microprocessor, a remote central processing unit, a combination thereof, or the like.

The control unit may comprise a user interface. The user interface may present the measured signal from the reflected light and provide the position of the ophthalmic instrument relative to the eye. For example, the control unit may provide positional information of the ophthalmic instrument relative to the eye on a user interface, giving the instructor the relevant information to move the ophthalmic instrument to the desired position by hand. The information may be presented as images, graphical data, visual or audible ques such as flashing light or a beep.

The control unit may be connected to an actuator. The actuator may be configured to move the detectors and/or the plate. The control unit may be connected to a plurality of actuators, wherein one actuator may be connected to the ophthalmic instrument. The control unit may instruct an actuator to move the ophthalmic instrument from the determined position to a desired position. The determined position may already be at the desired position, in which case the ophthalmic instrument remains stationary.

The control unit may be connected to the light source. The control unit may control the intensity, beam size or frequency of light. For example, if the detected signal is weak, the control unit may increase the intensity of the infrared light. If the detected position is at the desired position, the control unit may instruct the visible light source to send a light beam of a particular colour, for example green, to signal that the desired position has been achieved.

The apparatus may perform the method steps in accordance with the first aspect of the present disclosure.

The apparatus may comprise a camera. The camera may be positioned at 90° angle to the direction of the light beam and to the side of the patient's eye. The camera may take an image of the eye which can be used to assist the alignment of the ophthalmic instrument relative to the eye. The camera may be connected to the control unit. The control unit may have a user interface displaying the images. The camera may take multiple images and present real-time positional information of the eye. The image(s) may be displayed or printed to assist the process of aligning the ophthalmic instrument relative to the eye.

According to a third aspect, there is disclosed an ophthalmic instrument including the apparatus as described in the second aspect, wherein the ophthalmic instrument is an esthesiometer. The esthesiometer may comprise an elongated nozzle for the passage of air. The nozzle may be configured to direct the light from the source to the eye.

Other example embodiments will now be described in further detail with reference to FIGS. 1 to 7.

Figure 1:
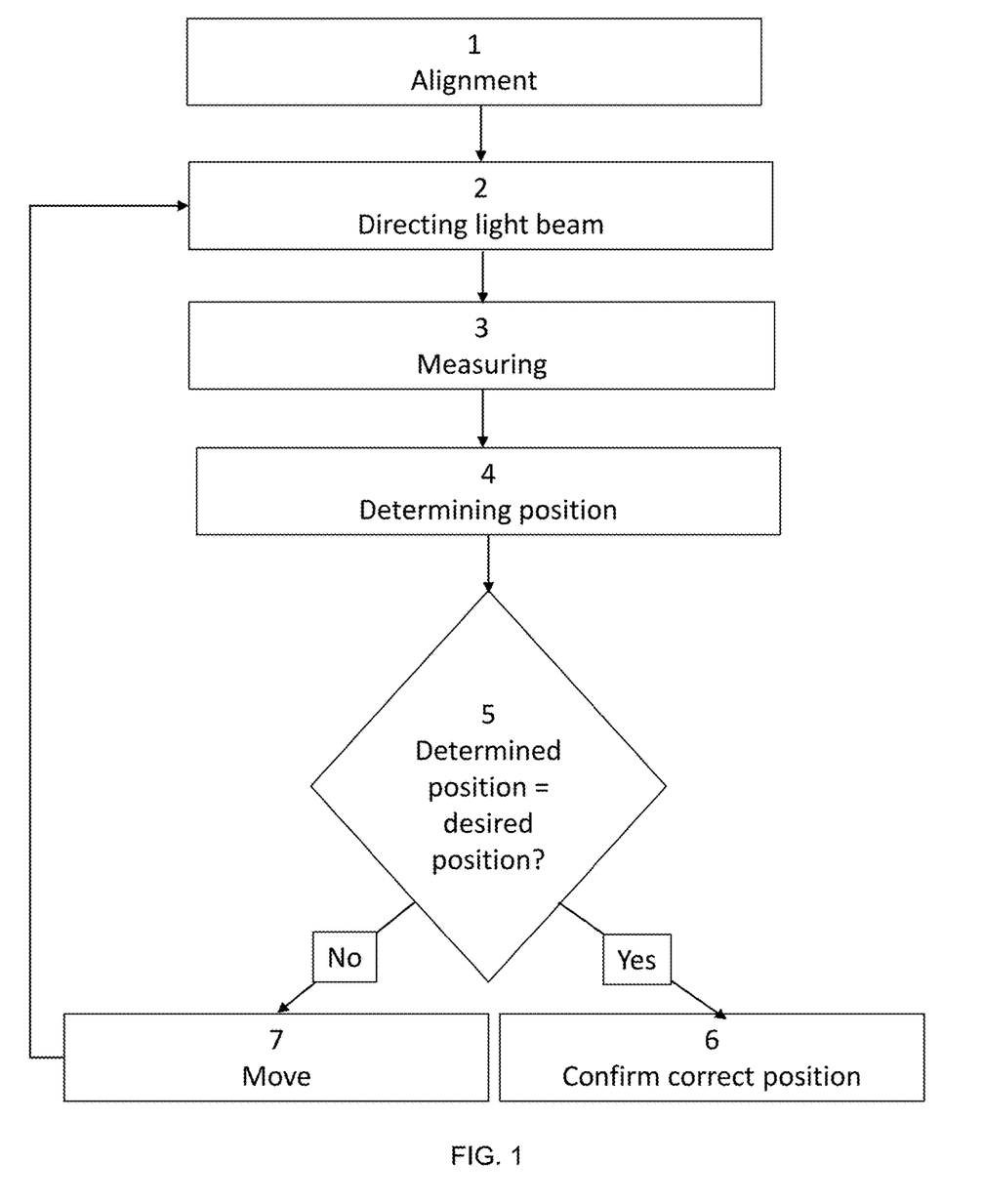
FIG. 1 shows steps for aligning an ophthalmic instrument relative to an eye according to a first example embodiment.

FIG. 1 shows the steps for aligning an ophthalmic instrument with respect to an eye. There is a first step 1 of initially aligning the ophthalmic instrument with respect to the eye, and preferably with the centre of the cornea of the eye. The cornea of the eye should be visible to the investigator when the patient's eye is open. The alignment may be done by the investigator. Alternatively, the alignment may be done by an actuator that is directed by a control unit.

There is a second step 2 of directing a beam of light from the ophthalmic instrument to the eye. The beam of light is approximately collimated and is preferably infrared (IR) light.

There is a third step 3 of measuring, at a plurality of positions around the beam, the light reflected from the cornea of the eye. The incident beam of light will be an approximately round beam of light with an associated diameter. The curvature of the cornea of the eye can be approximated to a convex surface which reflects the light away from the direction of the incident beam of light. In some examples, it is preferable to have at least three positions around the beam of light. At each position there is a detector, for example a photo-diode, or any other detectors than can detect IR light. The detectors can measure the intensity of the reflected light at each position.

The method comprises a fourth step 4 of determining the position of the ophthalmic instrument relative to the eye by comparing the distribution of reflected light across the plurality of positions. By comparing the signal received at each position around the beam of light, the position of the ophthalmic instrument relative to the eye can be determined. Preferably, the detectors would be located symmetrically around the beam and at equal distance along the z-axis, for example four detectors would be positioned at 90° angle to each other around the beam, such that the detectors form quadrants. Displacement along the x- and y-axis can be measured using the measurement of the light from each position that are diametrically opposite one another. Measurements along the z-axis may be made using the radial distribution of the signal around the beam.

The method comprises a fifth step 5 of determining if the determined position as measured in step three 3 is the desired position.

If the signal received at the detectors from the reflected light is approximately evenly distributed across the plurality of positions, the determined position along the x and y axes will be at the desired position. The radial distribution of the measured signal received at all the positions may determine the z-axis position. If the determined position is at the desired position, the method will move to a sixth step 6 which provides a signal to signify that the ophthalmic instrument is aligned with the eye, for example directing a flash of visible light to the eye or an audible sound.

If the signal received at the detectors from the reflected light is not evenly distributed across the plurality of positions, the determined position will not be at the desired position. The method will move to a seventh step 7 of moving the ophthalmic instrument relative to the eye from the determined position to a desired position. Moving the instrument relative to the eye is performed to equalise the imbalances in the measurements received at the detectors.

The method comprises repeating steps 2 to 5 in order to determine whether the ophthalmic instrument is aligned with the eye at the desired position. It will be appreciated that steps 2 to 5 will be repeated until the desired position is achieved. The detectors may be positioned at non-symmetrical angles around the z-axis and non-uniform distances along the z-axis, which may need to be considered when determining the position of the ophthalmic instrument relative to the eye.

Example apparatus will now be described with reference to FIG. 2. The apparatus 100 is for aligning an ophthalmic instrument 20 with a patient's eye 40. The ophthalmic instrument 20 is a pneumatic esthesiometer which has a nozzle 22. The sensitivity of the surface of the eye is determined by measuring the patient's response to air being blown to the eye 40 via the nozzle 22. A light unit 10 is located at one end of the esthesiometer 20, where the air is directed from. The nozzle 22 is an elongated tube with a receiving hole 22' and an exit hole 22". The nozzle 22 has a diameter of 1 mm. In other examples, the nozzle 22 may have a diameter that falls within the range of 0.1 mm to 6 mm.

The light unit 10 contains two different light sources; an infrared light source 4 and a visible light source 2. The light unit 10 also has a beam splitter 3. In the present embodiment, the beam splitter 3 is configured to allow the infrared light 4 to pass through with minimal reflection or deflection. The visible light source 2 is arranged perpendicular to the infrared light source 4 and is arranged to be reflected at the surface of the beam splitter 3. Both the infrared light source 4 and visible light source 2 are directed in the same direction towards an exit aperture of the lighting unit 10. The exit aperture of the lighting unit 10 is arranged at the entrance hole 22' of the nozzle 22, such that the nozzle 22 directs the infrared 4 and visible 2 light towards the eye 40. In the present example, the light unit 10 is attached to the nozzle 22 such that both the light unit 10 and the nozzle 22 will move together.

The cornea of the eye protrudes outwards and is approximately convex. The cornea is transparent to visible light so that signals can be sent to the brain which are converted into images. The visible light source 2 provides the patient with information on the alignment of their eye with respect to the ophthalmic instrument 20.

The infrared light 4 is a low intensity light source. The cornea is not transparent to infrared light so the infrared light 8 is reflected from the cornea of the eye 40. The curved surface of the cornea will reflect the infrared light 8 away from the eye and at an angle to the direction of the incident light. The angle of reflection will depend on the position of the esthesiometer 20 relative to the surface of the eye along the x-, y-, and z-axis.

The reflected infrared light 18 is detected by a plurality of detectors 28 arranged around the nozzle. The detectors are integrated on a plate 30, such as a sensor printed circuit board (PCB). The plate 30 has a central hole 31 for the nozzle 22 to pass therethrough. The plate 30 has a circular shape. In other examples, the plate may be a different shape. FIG. 2 shows four infrared detectors 28, two located above the nozzle 22 and two located below the nozzle 22; further detectors (not shown) are provided on either side of the nozzle 22 in the horizontal plane. In other examples, the outermost detectors 26 may be visible light detectors.

Figure 5A:
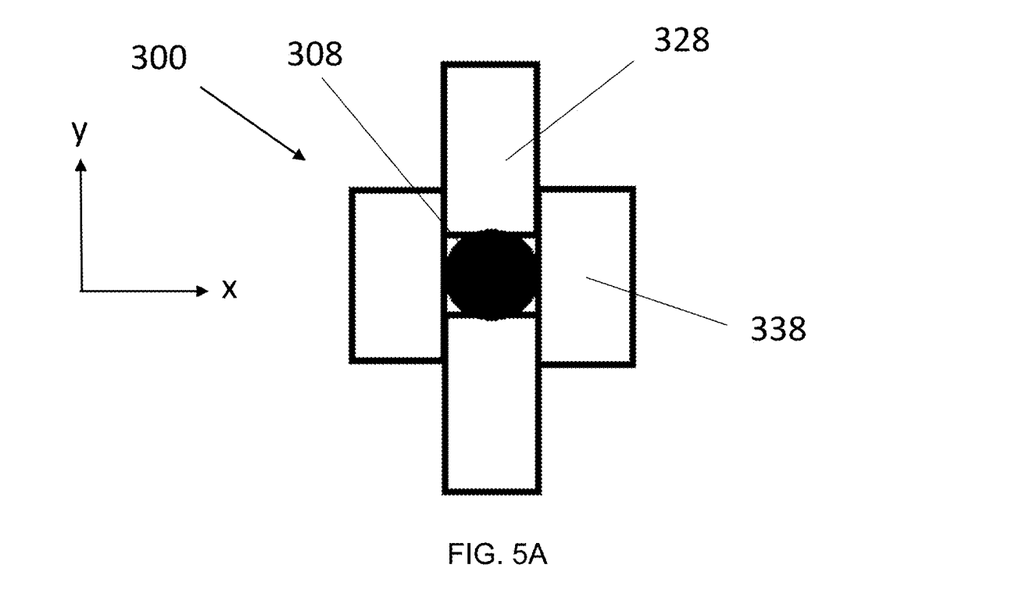
FIG. 5A shows a front view of the detector arrangement according to a fifth example embodiment.
Figure 5B:
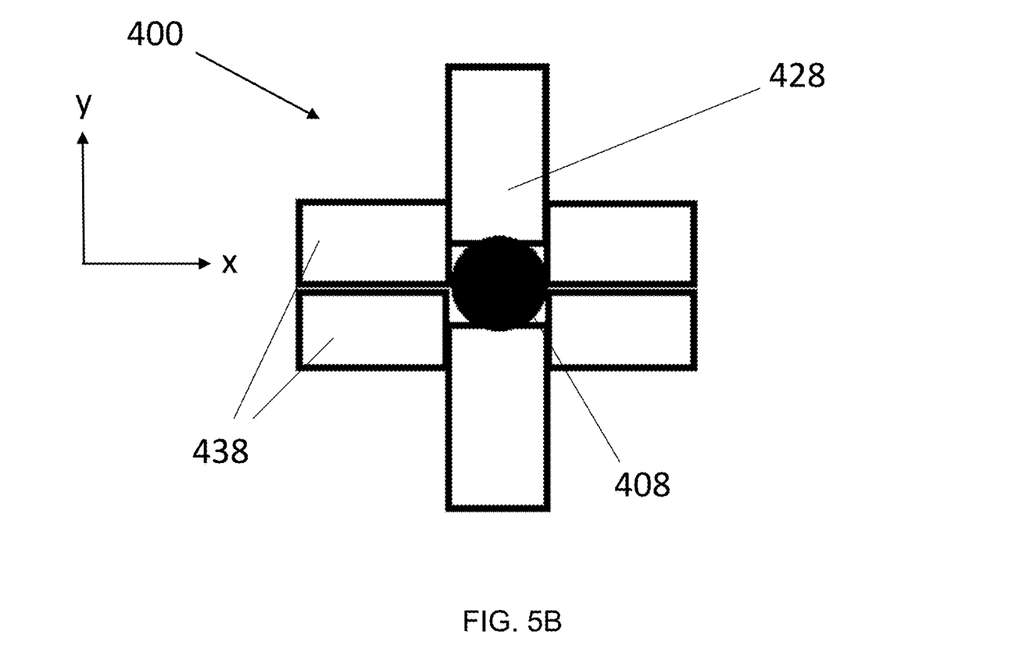
FIG. 5B shows a front view of the detector arrangement according to a sixth example embodiment.

Four detectors 28 can each be located at 90° to one another around the nozzle 22, preferably arranged symmetrically around the nozzle at positions above and below the nozzle 22 and to the right and left of the nozzle 22. This is shown in FIG. 5A and described in more detail below. In another example embodiment, there is an additional detector located at each left and right side of the nozzle 22 as shown in FIG. 5B and described in more detail below. The detectors 28 are arranged to measure the intensity of the reflected light 18 to determine the position of the esthesiometer 20 relative to the eye 40 along the x- and y-axis, and the radial distribution of the reflected light 18 to determine the position of the esthesiometer 20 relative to the eye 40 along the z-axis. In other examples, the detectors 28, 26 may be arranged differently around the nozzle 22.

The plate 30 and detectors 26, 28, are positioned at a distance away from the exit hole 22" of the nozzle 22. The distance between the detectors 26, 28, and the exit hole 22" of the nozzle 22 is 5 mm. (The distance between the detectors 26, 28, and the exit hole 22" of the nozzle 22 may be between 0.5 mm and 200 mm.)

A microcontroller 52 is connected to the plate 30. It may be connected via a wire, or it may be connected wirelessly (for example using Wi-Fi or Bluetooth). The microcontroller 52 receives information from the detectors 26, 28. The microcontroller 52 can control the position of the plate 30 along the length of the nozzle 22. In this embodiment, the plate 30 is stationary with respect to the nozzle 22. In other examples, the plate 30 may move along the z-axis. The plate may be rotatable around the axis of the nozzle 22.

The control unit 50 receives the detected signal from the detectors 26, 28 via the microcontroller 52. The control unit 50 converts the detected signal into two components (intensity and position of the reflected light 18 at each detector 26, 28) and determines the position of the nozzle 22 with respect to the eye 40 by comparing the signal at each detector 26, 28. If the determined position is not at the desired position, i.e. aligned with the centre of the cornea of the eye 40, the control unit 50 instructs a light source driver 54 to move the light unit 10, and as a result moves the esthesiometer 20 in a direction along the x, y, and/or z axis. If the esthesiometer 20 is at the desired location, the light unit 10 and the esthesiometer 20 will remain stationary. The control unit 50 can also instruct the light source drive 54 to change the intensity of the light sources 4, 2.

Figure 2:
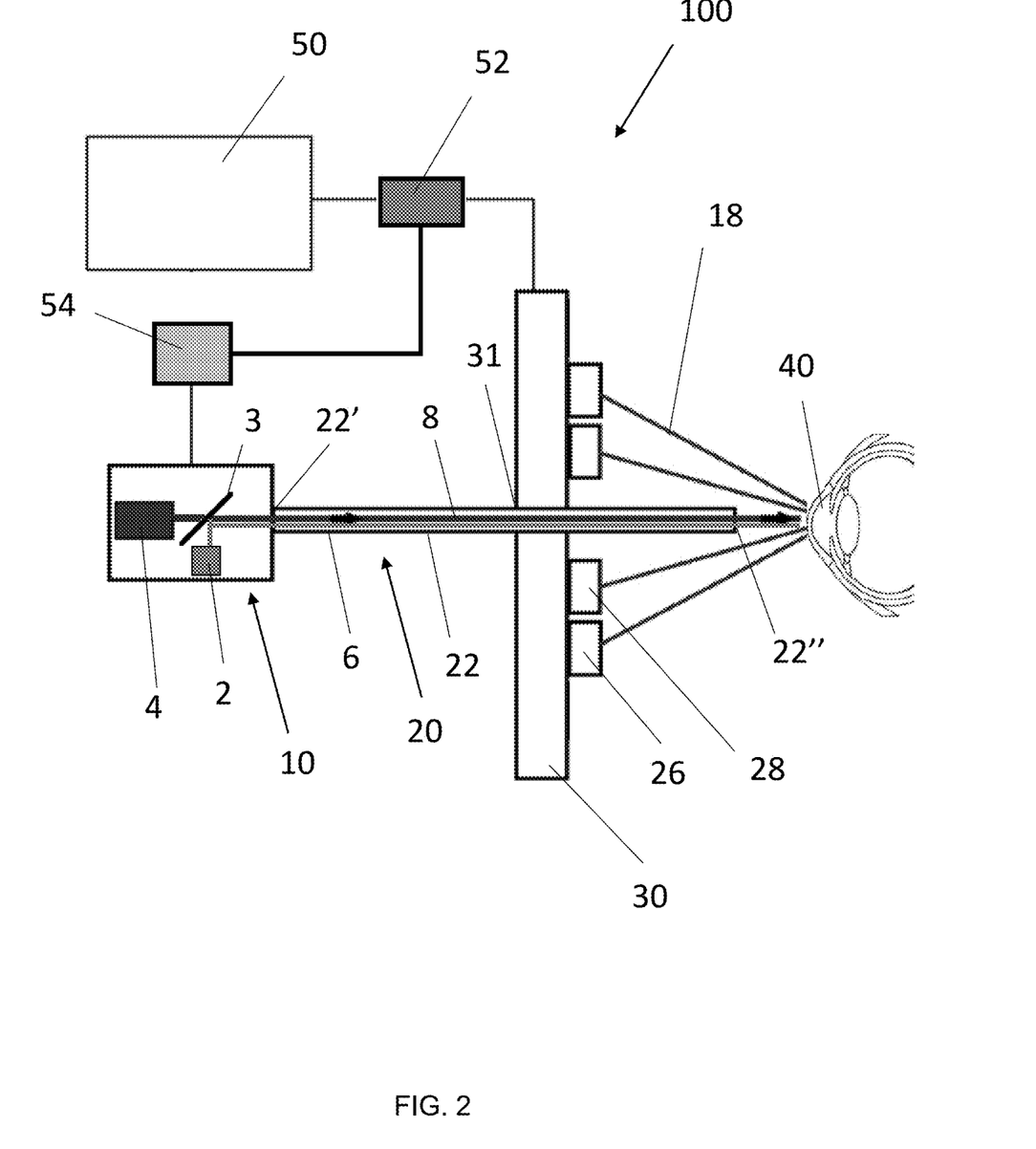
FIG. 2 shows schematically an apparatus for aligning an ophthalmic instrument relative to an eye according to a second example embodiment.
Figure 3:
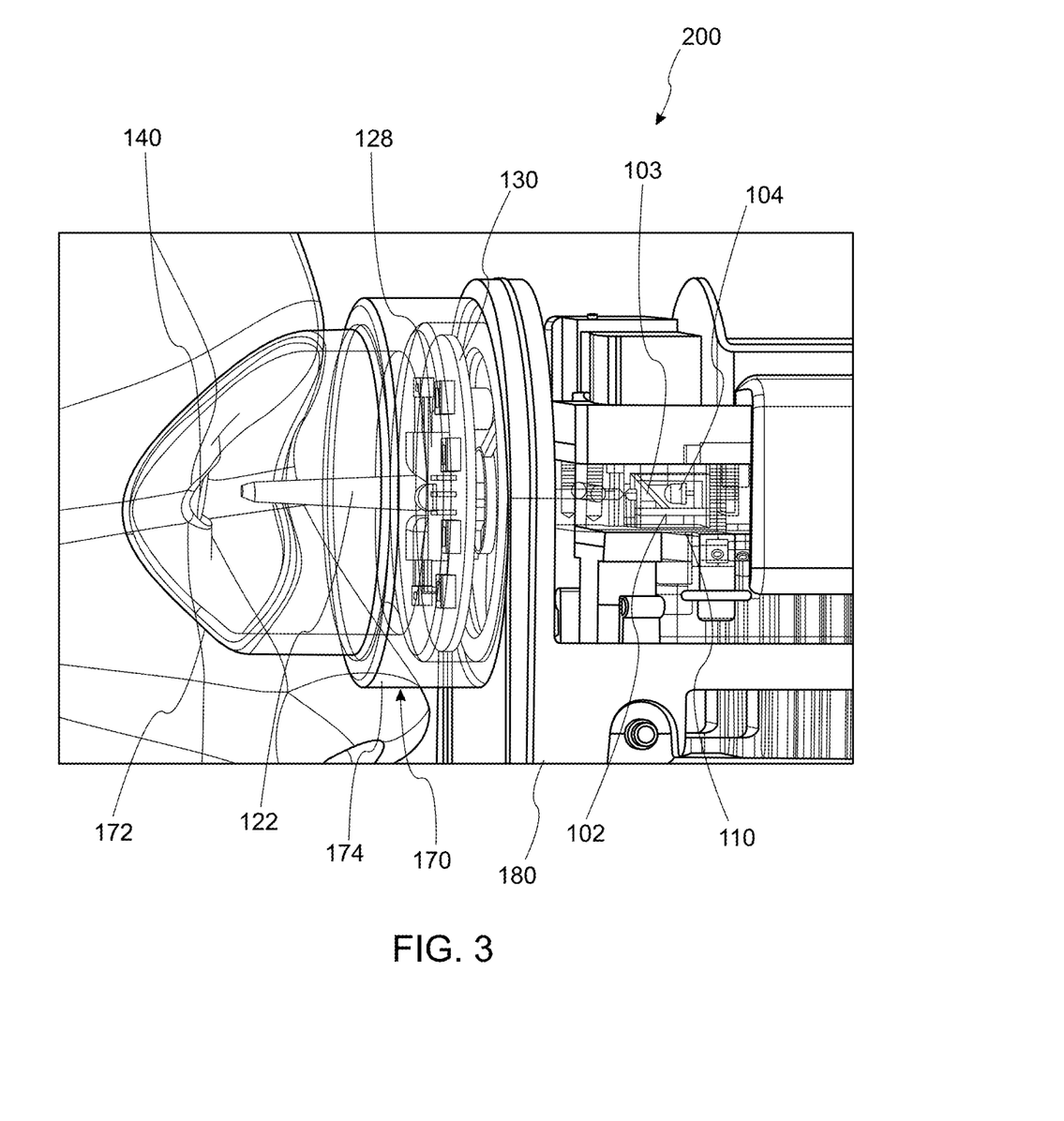
FIG. 3 shows a partially transparent view of an apparatus for aligning an ophthalmic instrument relative to an eye according to a third example embodiment.

A partially transparent view of an example embodiment of an apparatus 200 for aligning an ophthalmic instrument with a patient's eye 140 is shown in FIG. 3. FIG. 3 shows the apparatus 200 in use with a patient's eye 140. The apparatus 200 is substantially the same as the apparatus as described above in FIG. 2, with features that are the same being labelled with the same reference number but prefixed with the number "1". The apparatus 200 of the present example has a housing 180 which houses: the light unit 110 that has an infrared light source 104, a visible light source 102 and a beam splitter 103; and a control unit (not shown) to move the components of the apparatus 200. The housing 180 has an opening that is configured to receive and connect with an esthesiometer with a nozzle 122. The nozzle 122 is partially within the housing 180 and partially outside of the housing 180. An exit aperture of the light unit 110 is connected to the nozzle 122 to direct light from the light unit 110 towards the patient's eye 140.

Outside the housing 180 near the position of the housing opening, there is a plate 130 with a plurality of detectors 128. The plate 130 has a central hole for the nozzle 122 and is mounted to the outside of the housing 180 at a number of fixing positions by fixing means. In the present example, the plate 130 is attached to the outside of the housing 180 via screws at four fixing locations. In other examples, the plate may be attached to the outside of the housing 180 at more than four fixing locations or by other fixing means such as an adhesive. In the present example, the plate 130 has six detectors 128 symmetrically disposed around the nozzle 122, as shown in FIG. 5B.

Outside of the housing 180 at the housing's opening, the housing 180 is connected to an eye attachment 170. The eye attachment 170 has two parts: the connecting portion 174 that is configured to be screwed or slid on to the housing 180; and a curved eye portion 172 that is shaped to complement a patient's eye socket. The connecting portion 174 is circular and configured to house and fit around the external part of the nozzle 122, the plate 130 and the detectors 128. The eye portion 172 has a smaller diameter than the connecting portion 174. The furthermost end of the eye portion 172 is shaped to complement the shape of a patient's eye socket to assist in the alignment process by reducing movement of the apparatus 200 and to provide better comfort to the patient. Additionally, the eye attachment 170 prevents stray light from the external environment from entering the patient's eye 140 and potentially causing the patient to divert their gaze.

Figure 4A:
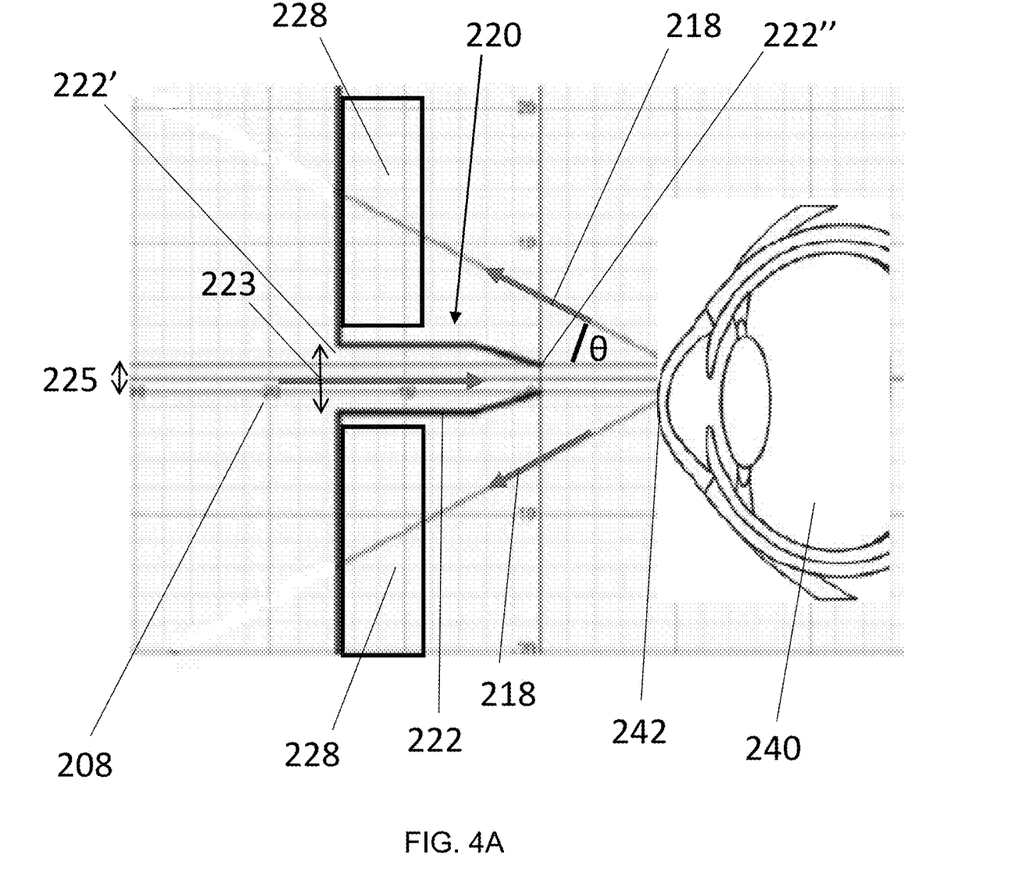
FIGS. 4A and 4B show, in cross section, a beam of light directed to, and reflected from, an eye according to a fourth example embodiment.

FIG. 4A shows a cross section of the beam of light entering an ophthalmic instrument 220 and directed to the eye 240 with ray tracing showing the direction of the reflected light 218 from the cornea 242 of the eye 240. Some features in the present example embodiment are the same as described above with reference to FIG. 2, with features that are the same being labelled with the same reference number but prefixed with the number "2". The infrared light beam 208 is directed from a light source (not shown) to the entrance aperture 222' of the nozzle 222 of the ophthalmic instrument 220. The entrance hole 222' has an opening diameter 223 that is larger than the diameter of the exit hole 222". The exit hole 222" of the nozzle 222 collimates the light 208 and defines the spot size of the light 208. In this example, the beam diameter 225 is 1 mm. It will be appreciated that other nozzles 222 may have an exit hole 222" with a different size, for example it may be between 0.5 and 1.5 mm. When the light beam 208 exits the nozzle 222 it is directed towards the cornea 242 of the eye 240 and is reflected at an angle θ to the incident beam of light 208. Due to the curvature of the cornea, the reflected light 218 is directed away from the nozzle 222 and towards the detectors 228. The detectors 228 are disposed a distance away from the exit aperture 222" along the z-axis, and are arranged symmetrically around the nozzle 222. In this example, only two detectors 228 can be seen, above and below the nozzle 222. Further detectors (not shown) may be provided on either side of the nozzle 222 in the horizontal plane.

Figure 4B:
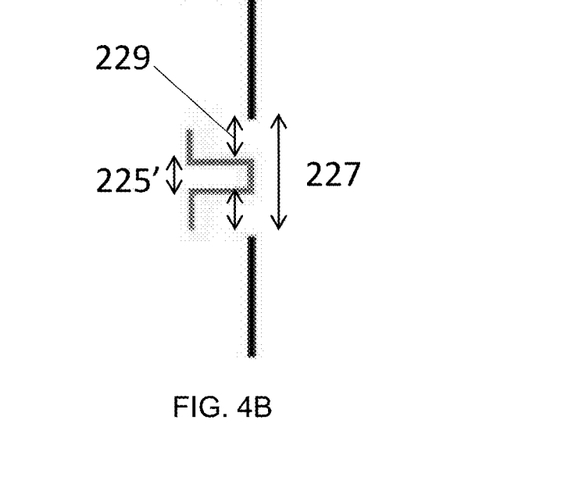

FIG. 4B shows an example of the beam diameter size 225' with respect to the diameter of a pupil 227 of the eye. In this example, the beam diameter 225' is 1 mm and the pupil diameter is 6 mm, giving an uncertainty in position of +/−2.5 mm. However, it has been shown that a signal is detectable at the detectors 228 for a beam spot size of 1 mm, providing a +/−0.4 mm accuracy in the z-axis and +/−0.1 mm accuracy in the x- and y-axes. 229 refers to pupil size with respect to beam diameter of the light (visible) used in the alignment system and the error in xy position determination if no alignment system is utilized. That is, if the subject only looked at the light (without sensors measuring the reflected light from cornea) to align in xy, this error can occur.

FIGS. 5A and 5B show example detector arrangements as viewed along the direction of the incident beam 308, 408.

FIG. 5A shows the detector arrangement 300 with four detectors arranged symmetrically around the beam 308. There are two identical y-axis detectors 328 symmetrically disposed above and below the beam 308, and two identical x-axis detectors 338 symmetrically disposed on the left and right sides of the beam 308.

FIG. 5B shows the detector arrangement 400 with a total of six detectors arranged symmetrically around the beam 408. There are two identical y-axis detectors 428 symmetrically disposed above and below the beam 408. There are four identical x-axis detectors 438 symmetrically disposed parallel to the x-axis. Two detectors adjacent to each other along the y-axis are on the left side of the beam 408 and two detectors adjacent to each other along the y-axis are on the right side of the beam 408. Although not clearly apparent from the schematic drawing, the two y-axis detectors 428 lie on a ring centred at the beam 408 having a first radius, forming an inner ring of detectors. The four x-axis detectors 438 also lie on a ring centred at the beam 408 having a second, larger radius, forming an outer ring of detectors.

Figure 6A:
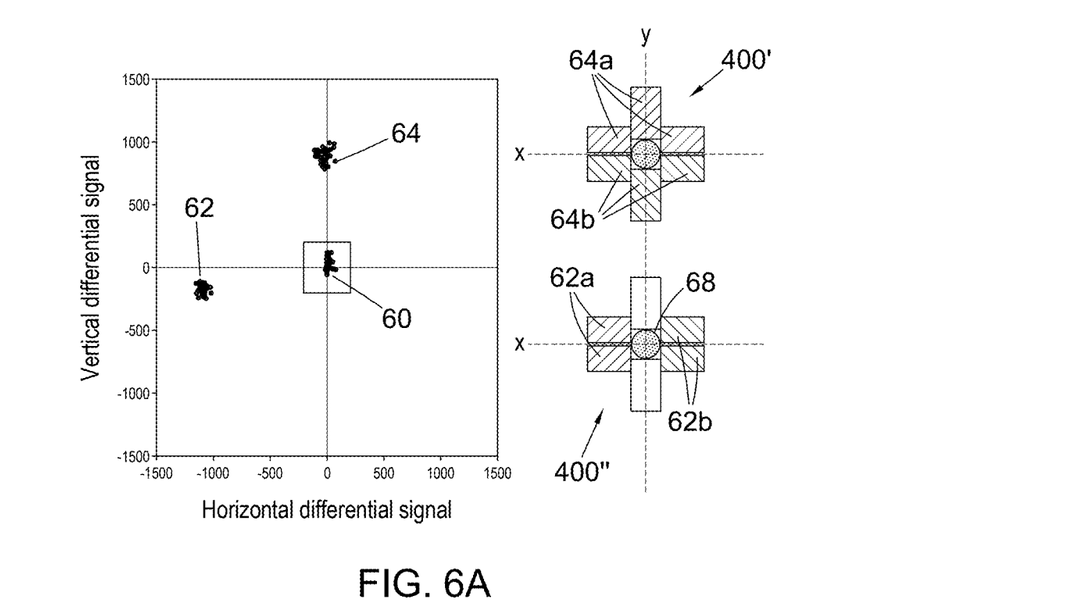
FIG. 6A shows graphical data representing the signal received at the detector in accordance with the sixth example embodiment for aligning an ophthalmic instrument along the x- and y-axis.
Figure 6B:
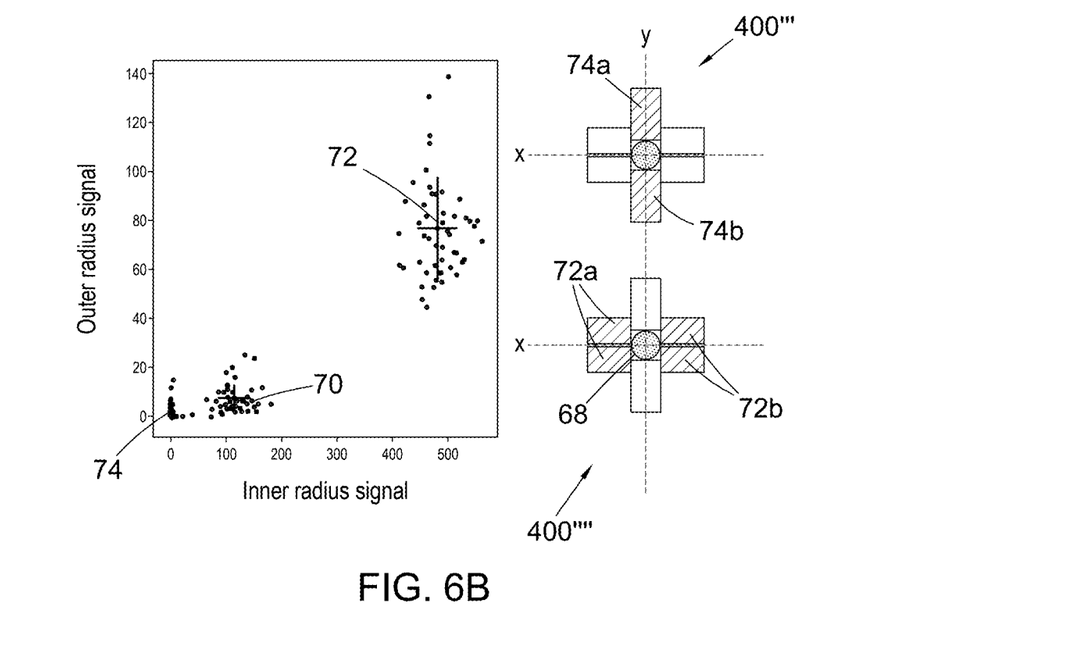
FIG. 6B shows graphical data representing the signal received at the detectors in accordance with the sixth example for aligning an ophthalmic instrument along the z-axis.

FIGS. 6A and 6B show measurement data which provides information on the alignment of the ophthalmic instrument relative to the eye.

FIG. 6A shows a plot of the signal detected at the detectors as described in FIG. 5B from light reflected from the cornea. Each red dot corresponds to a pulse of signal received. The central cluster of red dots 60 at (0, 0) corresponds to the nominal eye position i.e., where the ophthalmic instrument is aligned with the eye. The top cluster of red dots 64 at coordinates (0, 900) shows a deviation of the reflected light at +0.5 mm along the y-axis. The left cluster of red dots 62 at coordinates (−1100, −200) shows a deviation of the reflected light at +0.5 mm along the x-axis. The off-axis cluster of red dots 62, 64 can be used to identify the position of the ophthalmic instrument relative to the cornea of the eye. The ophthalmic instrument can then be moved relative to the eye (or the eye can be moved relative to the ophthalmic instrument) until the red dots are approximately at the centre 60. While 'red dots' are referred to in the figures, these dots are shown as black dots in the figures.

The measurements are taken by the detector arrangement 400' or 400" as shown to the right of the plot in FIG. 6A. The position of the ophthalmic instrument relative to the eye can be determined by the signal received at a set of detectors 64a and 64b, 62a and 62b that are diametrically opposed. In one detector arrangement 400', the signal received at the upper half of the detector arrangement 64a is compared to the signal received at the bottom half of the detector arrangement 64b to provide the y-axis component of the position of the ophthalmic instrument relative to the eye. In another detector arrangement 400", the signal received at the detector arrangement 62a to the left of the light beam 68 is compared to the signal received at the detector arrangement 62b to the right of the light beam 68 to provide the x-axis component of the position of the ophthalmic instrument relative to the eye.

FIG. 6B shows a plot of the radial distribution of the inner and outer radius signals received at the detectors lying on the inner and outer rings respectively. These signals provide information on the alignment of the ophthalmic instrument relative to the eye along the z-axis. The nominal position 70 of the ophthalmic instrument relative to the eye along the z-axis is at approximate coordinate position (100, 10) which corresponds to a distance of 5 mm between the exit aperture of the nozzle and the surface of the cornea of the eye. The top cluster of red dots 72 at approximate coordinates (475, 78) shows a deviation of the reflected light of +1.0 mm along the z-axis. The left cluster of red dots 74 at approximate coordinates (0,0) shows a deviation of −1.0 mm along the z-axis. The off-axis cluster of red dots 72, 74 can be used to identify the distance between the ophthalmic instrument and the cornea of the eye. If the measured position is not at the desired position, the ophthalmic instrument can be moved relative to the eye (or the eye can be moved relative to the ophthalmic instrument) until the red dots are approximately at the centre 70.

The measurements are taken by the detector arrangement 400''', 400'' as shown to the right of the plot in FIG. 6B. The position of the ophthalmic instrument relative to the eye along the z-axis can be determined by measuring absolute intensity at the diametrically opposed detectors 74*a*, 74*b* lying on the inner ring of detectors, or by measuring absolute intensity at the diametrically opposed detectors 72*a*, 72*b* lying on the outer ring of detectors. To determine the position of the ophthalmic instrument relative to the eye along the z-axis over the full dynamic range, absolute intensity measurements from the diametrically opposed detectors 72*a* 72*b* lying on the outer ring of detectors and from the diametrically opposed detectors 74*a*, 74*b* lying on the inner ring of detectors may be used.

Alternatively, the position of the ophthalmic instrument relative to the eye along the z-axis can be determined from relative intensity measurements. Intensity can be measured at the diametrically opposed detectors 74*a*, 74*b* lying on the inner ring of detectors, and this can be compared to intensity measured at the dynamically opposed detectors 72*a* 72*b* lying on the outer ring of detectors.

Figure 7:
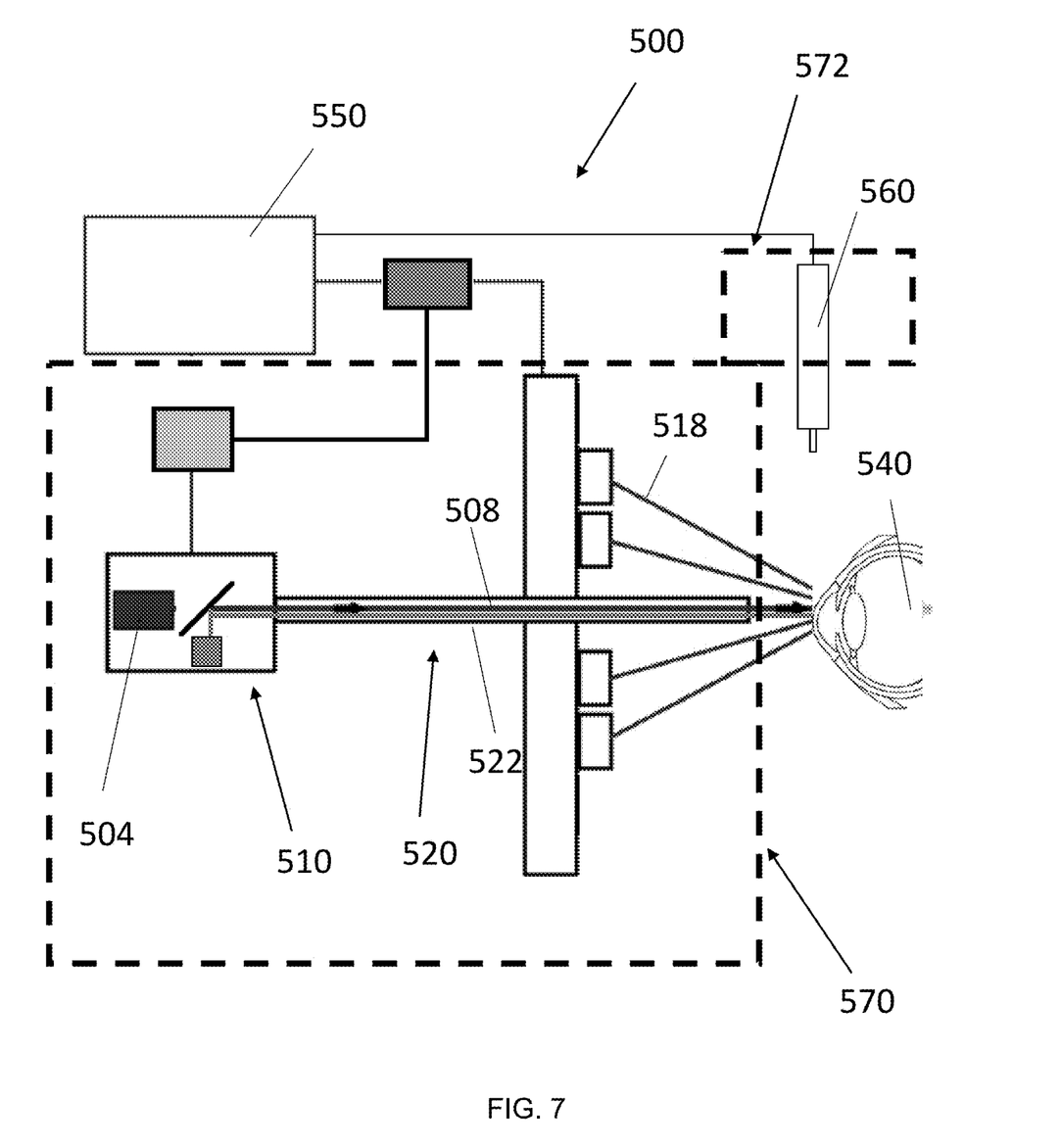
FIG. 7 shows schematically an apparatus for aligning an ophthalmic instrument according to a seventh example embodiment.

FIG. 7 shows a schematic cross section of an example embodiment showing an apparatus 500 for aligning an ophthalmic instrument 520 with an eye 540. Some of the features of the present example embodiment are the same as the features as described above with reference to FIG. 2. The features have been labelled with the same reference numbers but are prefixed with the number "5". The different features of the present example embodiment will now be described. The apparatus 500 has: a housing 570 that houses the light unit 510, which has the infrared light source 504; the ophthalmic instrument 520 with the nozzle 522 which directs the infrared light 508 towards the cornea of the patient's eye 540; and the detectors which are arranged around the nozzle 522. The apparatus 500 also has a camera 560 that is positioned at a 90° angle with the optical axis of the eye 540. The camera 560 is positioned to the side of the eye such that the viewing axis of the camera is arranged to view the surface of the eye i.e., the cornea. The camera 560 is arranged to assist with the alignment of the ophthalmic instrument 520 relative to cornea of the eye 540. The reflected light 518 from the eye 540 is shown. The camera 560 provides additional support to the instructor by presenting a visible image of the position of the eye relative to the ophthalmic instrument 520. The camera 560 is mounted on a separate mount or support bracket 572 which is connected to the housing 570. The camera 560 is connected to the control unit 550 to exchange information and control the position of the camera relative to the eye 540.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the example embodiment as shown in FIG. 2, there may be a second set of detectors arranged circumferentially around the first set of detectors. For example, the first set of detectors may have four detectors arranged at a 90° angle to each other around the central hole 31 of the plate 30. The second set of detectors may have four detectors arranged at positions that are at 90° angle and arranged circumferentially around the first set of detectors. The additional detectors positioned furthest away from the central hole 31 may provide information on the radial distribution of the reflected light 18, which determines the position of the esthesiometer 20 relative to the eye 40 along the z-axis. There may be more infrared detectors 28 distributed around the central hole 31 for example there may be a total of eight detectors, each detector located at 45° to one another around the central hole 31.

In some examples, the control unit 50 may comprise a user interface (not shown). When the control unit 50 determines the position of the nozzle 22 with respect to the eye 40, the user interface may show visual information, such as a graph or chart, which locates the position of the reflected light 18 around the nozzle 22. The investigator may use this information to move the esthesiometer 20 with respect to the eye 40 by hand. The investigator may use the information to direct the patient to move their head with respect to the esthesiometer.

In the example embodiment of the apparatus 100, the visible light source 2 is used as an indicator of the alignment of the nozzle 22 with the patient's eye. The control unit 50 may instruct the visible light source 2 to send a pulse of visible light 6 to the eye 40, for example if the determined position is not at the desired position it may send a beam of red light. If the determined position is at the desired position, the visible light source 2 may send a beam of green light. In other examples, other colours may be used. The visible light 6 may be a pattern of pulses.

In the example embodiment as shown in FIG. 7, the camera 560 may be positioned along the x-axis or y-axis, at any position around the optical axis. The camera 560 may take multiple images of the cornea of the eye 540. The camera 560 may be a video recorder that records the alignment of the ophthalmic instrument 520 relative to the eye 540. The control unit 550 may store the data taken from the camera 560, where the data can either be saved, displayed or printed as images. The control unit 550 may display the images on a user interface so that the investigator can have a real-time view of the side of the eye 540. The control unit 550 may also be configured to adjust the position of the camera 560. There may be one or more actuators (not shown) that move the camera 560 relative to the eye 540. In other examples, the position of the camera 560 may be manually adjusted, for example by the investigator. The camera 560 may not be connected to the control unit 550. The support bracket 572 may be a tripod which is independent to the housing 570 of the apparatus 500.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The present invention includes the following aspects/embodiments/features in any order and/or in any combination:

1) A method of aligning an ophthalmic instrument with respect to an eye, comprising the steps of:
   a) directing a beam of light from the ophthalmic instrument to the eye;
   b) taking, at a plurality of locations around the beam, measurements of reflections of the light from the eye;
   c) determining the position of the ophthalmic instrument relative to the eye from the measurements;
   d) moving the ophthalmic instrument relative to the eye from the determined position to a desired position.
2) The method according to clause 1 comprising the step of aligning the ophthalmic instrument with the centre of the cornea of the eye and at a predetermined distance from the cornea.
3) The method according to clause 1 or 2 wherein the beam of light is collimated light.
4) The method according to any preceding clause wherein the intensity of the reflected light is measured.
5) The method according to any preceding clause wherein the reflected light is reflected from the cornea.
6) The method according to any preceding clause wherein the reflected light is measured in at least three positions.
7) The method according to any preceding clause wherein the plurality of locations is arranged symmetrically around the beam.
8) The method according to any preceding clause wherein the determining step provides the position of the ophthalmic instrument relative to the eye in one, two, and/or three spatial axes.
9) The method according to any preceding clause wherein the determining step comprises calculating the difference in the light received at each of the plurality of locations.
10) The method according to any preceding clause wherein the determining step comprises calculating the total amount of incident light received at each of the plurality of locations.
11) The method according to any preceding clause wherein the step of moving is done in the direction that equalizes the measurements of the reflected light at corresponding locations around the beam.
12) The method according to any preceding clause comprising a step of providing instructions for moving the ophthalmic instrument with respect to the eye.
13) An apparatus for aligning an ophthalmic instrument relative to an eye comprising:
   a source of collimated light configured to be directed through an aperture to an eye;
   a plurality of detectors arranged around the aperture to measure light reflected from the eye;
   a control unit configured to determine the position of the ophthalmic instrument relative to the eye and to move the relative positions of the ophthalmic instrument and the eye from the determined position to a desired position.
14) An apparatus according to clause 13 wherein the light is infra-red light.
15) An apparatus according to clause 13 or clause 14 wherein the light is directed through an elongate nozzle.
16) An apparatus according to any of clauses 13 to 15 wherein the detectors are arranged symmetrically around the aperture.
17) An apparatus according to any of clauses 13 to 16 wherein the detectors are photodiodes.
18) An apparatus according to any of clauses 13 to 17 comprising an actuator for adjusting the distance of the ophthalmic instrument relative to the eye.
19) An ophthalmic instrument including the apparatus of any of clauses 13 to 18.
20) An ophthalmic instrument according to clause 19 wherein the ophthalmic instrument is an esthesiometer.
21) An ophthalmic instrument according to clause 20 wherein the light is directed down a nozzle of the esthesiometer.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

As used herein, an element or operation recited in the singular and proceeded with the word "a" or "an" should be understood as not excluding plural elements or operations, unless such exclusion is explicitly recited. In other words, "a" or "an" include one or at least one or more than one. Furthermore, references in the present disclosure to "one embodiment", "an embodiment", or even "a preferred embodiment" are not intended to exclude additional embodiments that also incorporate the recited features.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used. Accordingly, the claims set forth below should be construed in view of the full breadth and spirit of the present invention as described herein.

The invention claimed is:

1. A method of aligning an ophthalmic instrument with respect to a centre of a cornea of an eye, comprising the steps of:

a) directing a beam of light from the ophthalmic instrument to the cornea of the eye along a direction of an optical axis of the eye;
b) taking, at a plurality of locations around the beam using at least three photodiodes, measurements of intensity of the light reflected from the cornea of the eye;
c) determining the position of the ophthalmic instrument relative to the eye from the measurements of intensity of the light reflected from the cornea of the eye in three spatial axes;
d) moving the ophthalmic instrument relative to the eye from the determined position to a desired position in the three spatial axes, wherein the desired position is a position that equalizes the measurements of the intensity of the light reflected from the cornea of the eye taken at a plurality of locations around the beam using the at least three photodiodes.

2. The method according to claim 1, comprising the step of aligning the ophthalmic instrument with the centre of the cornea of the eye and at a predetermined distance from the cornea.

3. The method according to claim 1, wherein the beam of light is collimated light.

4. The method according to claim 1, wherein the photodiodes are arranged symmetrically around the beam.

5. The method according to claim 1, wherein the determining step comprises calculating the difference in the intensity of light received at each of the plurality of locations.

6. The method according to claim 1, wherein the determining step comprises calculating the total amount of incident light received at each of the plurality of locations.

7. The method according to claim 1, comprising a step of providing instructions for moving the ophthalmic instrument with respect to the eye.

8. An apparatus for aligning an ophthalmic instrument relative to a centre of a cornea of an eye comprising:
an aperture;
a source of collimated light configured to be directed through the aperture to the cornea of the eye and positioned along an optical axis of the eye;
at least three photodiodes arranged around the aperture to measure intensity of light reflected from the cornea of the eye;
a control unit configured to determine, in three spatial axes, the position of the ophthalmic instrument relative to the eye, and to provide instructions to a user interface and/or an actuator for adjusting the distance of the ophthalmic instrument relative to the cornea of the eye from the determined position to a desired position, wherein the desired position is a position that equalizes the measurements of the intensity of light reflected from the cornea of the eye taken at a plurality of locations around the beam using the at least three photodiodes.

9. The apparatus according to claim 8, wherein the light is infra-red light.

10. The apparatus according to claim 8, wherein the light is directed through an elongate nozzle.

11. The apparatus according to claim 8, wherein the photodiodes are arranged symmetrically around the aperture.

12. An ophthalmic instrument including the apparatus of claim 8.

13. The ophthalmic instrument according to claim 12, wherein the ophthalmic instrument is an esthesiometer.

14. The ophthalmic instrument according to claim 13, wherein the light is directed down a nozzle of the esthesiometer.

* * * * *